United States Patent [19]

Saylor et al.

[11] 4,155,211

[45] May 22, 1979

[54] SOUND ABSORBING PANEL

[75] Inventors: Charles J. Saylor, Zeeland; Richard G. Haworth, Holland, both of Mich.; Lyle F. Yerges, Downers Grove, Ill.

[73] Assignee: Haworth Mfg., Inc., Holland, Mich.

[21] Appl. No.: 863,929

[22] Filed: Dec. 23, 1977

[51] Int. Cl.² .............................................. E04B 2/28
[52] U.S. Cl. ........................................ 52/809; 52/145; 181/295; 428/113
[58] Field of Search ................. 181/30, 222, 284, 287, 181/290, 293, 295, 292; 52/615, 144, 145, 615, 809; 428/113, 116

[56] References Cited

U.S. PATENT DOCUMENTS

| | | | |
|---|---|---|---|
| 3,121,262 | 2/1964 | Loncoske | 52/145 X |
| 3,507,355 | 4/1970 | Lawson | 181/292 |
| 3,640,357 | 2/1972 | Kitching et al. | 181/292 |
| 3,769,767 | 11/1973 | Scott | 52/615 |
| 3,948,346 | 4/1976 | Schindler | 181/292 |
| 4,037,379 | 7/1977 | Ozanne | 52/615 |
| 4,047,337 | 9/1977 | Bergstrom | 52/145 |

Primary Examiner—J. Karl Bell
Attorney, Agent, or Firm—Blanchard, Flynn, Thiel, Boutell & Tanis

[57] ABSTRACT

An upright space divider panel having a rigid rectangular frame, and first and second thin sheetlike skins fixed to opposite sides of the frame and extending across the region defined therein. A honeycomb core structure is disposed within the frame and confined between the skins. The honeycomb core structure comprises a cellular honeycomb layer having a plurality of cells formed therein and extending across the width of the layer, so that opposite ends of the cells are closed by the skins. The first and second skins are identical and each have a plurality of openings formed therethrough. The openings in the first skin communicate with a first plurality of the cells for forming a first plurality of sound absorbing chambers which open outwardly through one side of the panel. The openings in the second skin communicate with a second plurality of the cells for forming a second plurality of sound absorbing chambers which open outwardly through the other side of the panel. The cells of the second plurality are different from the cells of the first plurality.

18 Claims, 9 Drawing Figures

SOUND ABSORBING PANEL

FIELD OF THE INVENTION

This invention relates to a wall or space divider structure built up of a plurality of prefabricated panels and, in particular, to an improved acoustical panel which possesses a high noise reduction coefficient while additionally possessing sufficient strength to permit fixtures and accessories to be hung thereon.

BACKGROUND OF THE INVENTION

Wall structures formed from a plurality of interconnected, prefabricated and portable panels are used extensively in commercial and industrial buildings for dividing interior regions into smaller work regions. Such structures have proven particularly effective in providing greater privacy within the building, and at the same time improving the interior appearance. For this purpose, the panels are provided with many different exterior finishes, such as colored plastics, carpets and fabrics. Some of these panels also tend to minimize noise, particularly when they are provided with soft exterior finishes, such as by being covered with carpeting or fabric. Many panels of this type are also provided with slotted rails extending vertically along the edges thereof, whereupon fixtures such as desks, shelves, filing cabinets and the like can be mounted on the panels. Due to the desire to mount these fixtures on the panels, the panels thus must be provided with substantial strength and, accordingly, are normally provided with a relatively strong and rigid core so as to provide the necessary strength.

While panels of the above type do tend to minimize noise, nevertheless any noise absorption capability of the panel is normally provided solely by the outer coverings. Further, since these panels are normally of a height substantially less than the floor-to-ceiling height, this also permits the transmission of substantial noise over the panel which, when coupled with the inability of these panels to absorb a high percentage of sound at various frequencies, thus results in these panels being unacceptable for use in situations where a high noise reduction and absorption by the panel is necessary. Because of this inability to absorb a high percentage of the sound in the environment, these known panels have conventionally been referred to as non-acoustical-type panels.

In recognition of this problem, copending applications Ser. No. 631,855, filed Nov. 14, 1975, now Pat. No. 4,084,366, and Ser. No. 761,777, filed Jan. 24, 1977, now Pat. No. 4,084,367, which are both owned by the assignee of this invention, disclose an acoustical panel which represents a substantial improvement over prior structures in terms of its ability to absorb a high percentage of various frequency sound waves while at the same time being both aesthetically pleasing in appearance and structurally strong so as to permit accessories and fixtures to be hung thereon. In the panel disclosed in the above-mentioned applications, the core of the panel is provided with a honeycomb structure which is covered by perforated side skins to form a plurality of Helmholtz resonators for effectively absorbing sound waves, particularly those sound waves of lower frequencies. The side skins in turn are covered by layers of porous sound absorbing material, such as fiber glass, to effectively absorb those sound waves of high frequencies, whereby the resultant panel possesses a capability of absorbing a high percentage of the sound wave frequencies normally encountered within an office-type working environment, with the resultant panel thus having a high noise reduction coefficient (NRC).

While the panel disclosed in the above-mentioned applications has proven extremely successful for absorbing the undesired sound frequencies while still possessing the necessary structural strength required for hanging fixtures and the like, nevertheless substantial additional research and development has been carried out on acoustical panels of this type in an attempt to further improve upon the structural and sound absorbing characteristics thereof, particularly so as to provide an improved panel which can be manufactured and assembled in a more economical manner while at the same time retaining or improving upon the desired sound absorption characteristics of the panel. For example, in a preferred embodiment of the panel disclosed in the above-mentioned applications, two honeycomb layers are disposed back-to-back within the core, and each layer has cells of at least two different sizes. This structure is costly in view of the need to use specialized honeycomb possessing several sizes of cells, and the necessity of having to utilize two honeycomb layers within each panel. This additionally increases the complexity of the manufacturing and assembling techniques, and complicates the necessary alignment between the apertures in the side skins and the cells of the honeycomb layers in order to provide the desired Helmholtz sound-absorbing resonators.

Accordingly, it is an object of the present invention to provide an improved acoustical panel for absorbing a large degree of directed sound of various frequencies, which panel possesses a high noise reduction coefficient and also possesses substantial strength to enable fixtures to be hung thereon, and which can be manufactured in a simplified and more economical manner.

It is also an object of this invention to provide an improved acoustical panel, as aforesaid, which can utilize a standardized honeycomb layer of a single cell size, which can utilize a single honeycomb layer within the panel core, and which has pluralities of honeycomb cells communicating with apertures in the opposite side skins of the panel to form Helmholtz resonators on both sides of the panel.

Another object of the invention is to provide an acoustical panel, as aforesaid, wherein identical side skins can be provided on opposite sides of the panel, which skins have a selected pattern of apertures therein so that a single honeycomb layer can be utilized within the core while a first plurality of cells communicate with one side of the panel and a second plurality of cells communicate with the other side of the panel, thereby forming Helmholtz resonators communicating with both sides of the panel, while at the same time resulting in a simplified panel structure which is economical to manufacture and assemble.

A further object of this invention is to provide an improved acoustical panel, as aforesaid, which permits efficient absorption of an even larger range of sound wave frequencies by permitting the formation of a large number of different Helmholtz resonators capable of absorbing different sound wave frequencies, while at the same time providing a panel which is of maximum structural simplicity and which permits manufacturing and assembling of the panel in a manner which maximizes the permissible manufacturing and assembly tolerances while still resulting in a panel possessing the desired Helmholtz resonators.

Other objects and purposes of the invention will be apparent to persons familiar with structures of this general type upon reading the following specification and inspecting the accompanying drawings.

Figure 1:
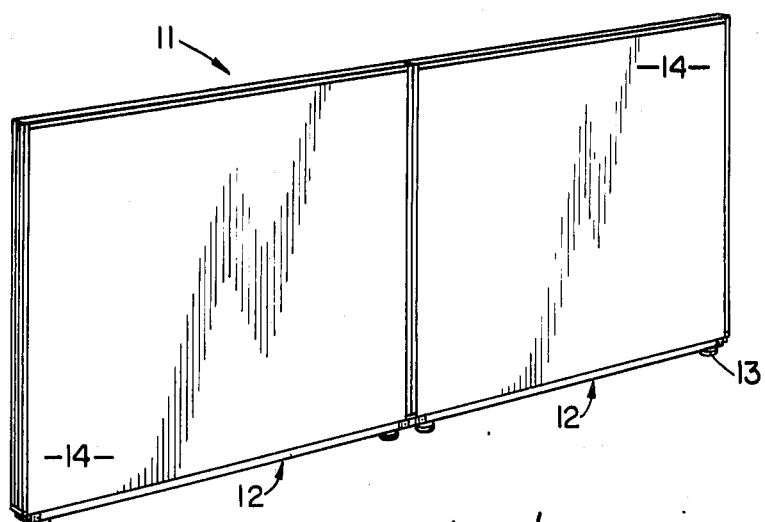
FIG. 1 is a perspective view of a wall or partition system formed from two prefabricated movable panels.

Certain terminology will be used in the following description for convenience in reference only and will not be limiting. For example, the words "upwardly," "downwardly," "rightwardly" and "leftwardly" will refer to directions in the drawings to which reference is made. The words "inwardly" and "outwardly" will refer to directions toward and away from, respectively, the geometric center of the panel and designated parts thereof. Said terminology will include the words specifically mentioned, derivatives thereof and words of similar import.

DETAILED DESCRIPTION

FIG. 1 illustrates part of a wall system 11 formed by a pair of substantially identical, prefabricated, acoustical-type portable panels or partitions 12. The panels are supported in an upright position on a support surface, such as a floor, by adjustable feet 13. The panels have opposed planar side surfaces 14. While two panels have been illustrated, it will be appreciated that any desired number of panels can be connected together in aligned or angled relationship.

Figure 2:
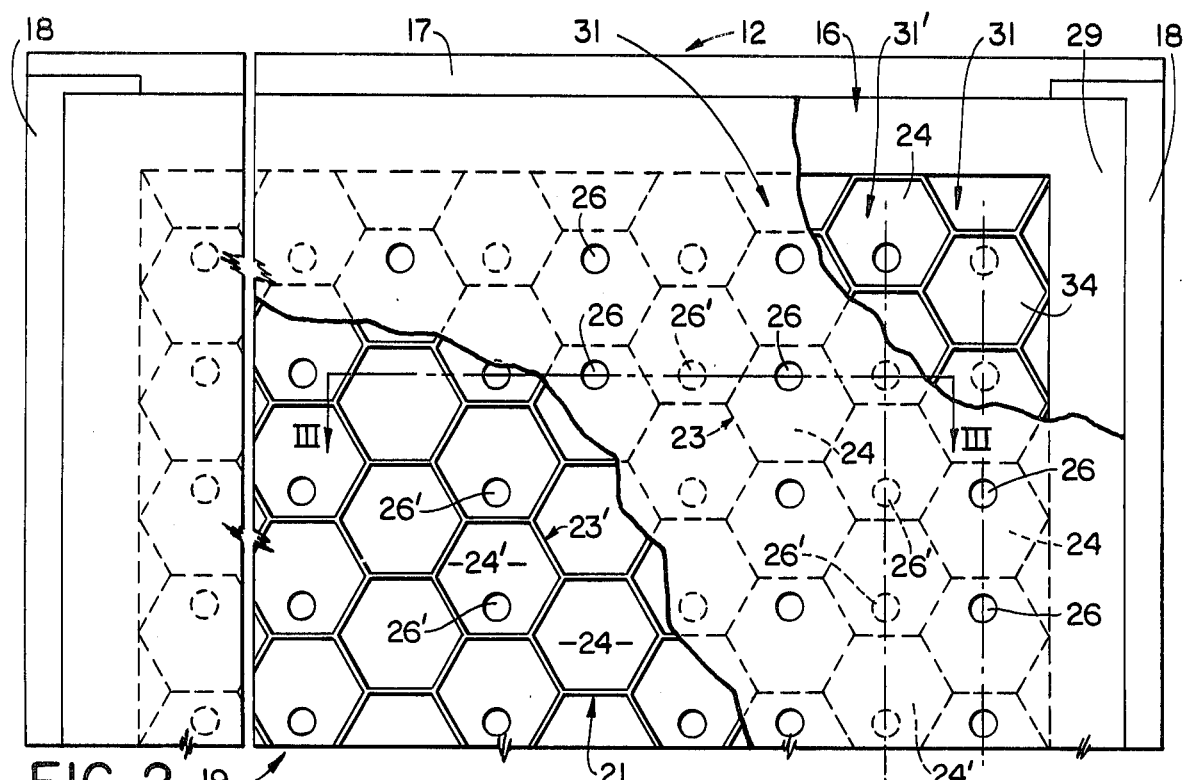
FIG. 2 is a fragmentary side elevational view of one embodiment of an acoustical panel according to the present invention and showing a part of one side skin removed for clarity of illustration.

The panel 12 is of substantially rectangular shape and is defined by horizontally extending top and bottom edges joined by opposed vertically extending side edges. This rectangular shape is defined by a rigid rectangular frame 16 disposed internally of the panel and formed from a plurality of substantially channel-shaped rails. One channel-shaped rail 17, as illustrated in FIG. 2, extends along the lower edge of the panel. The frame also includes a channel-shaped rail 18 extending vertically along each side edge of the panel.

Figure 3:
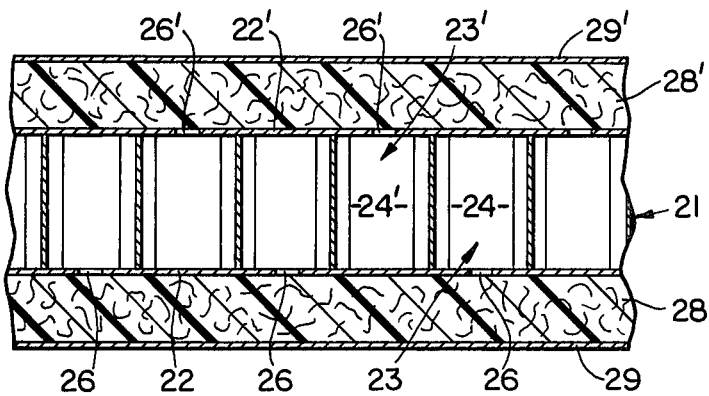
FIG. 3 is a fragmentary sectional view taken substantially along the line III—III in FIG. 2.

The frame 16 supports a sound absorbing core structure 19 which, as shown in FIGS. 2 and 3, includes a honeycomb layer 21 disposed within the rectangular frame, which honeycomb layer in turn has the opposite faces thereof secured to a pair of thin facing sheets or skins 22 and 22' disposed on opposite sides of the panel. These skins 22 and 22' are fixedly secured to the opposite sides of the honeycomb layer and are also fixedly secured to the opposite sides of the frame, as by an adhesive. These facing skins are normally of a thin sheet metal and confine the honeycomb layer or core 21 therebetween.

The core structure 19, as formed by honeycomb layer 21 and skins 22 and 22', forms a plurality of sound-absorbing chambers 23 (normally referred to as Helmholtz resonators). Each resonator 23 is formed by a cell 24 defined within the interior of the honeycomb layer 21, and an opening or aperture 26 which extends through the skin 22 and communicates with the cell 24 to allow sound waves to enter into the cell so that same will be absorbed.

To further assist in absorbing undesired sound waves, particularly those of higher frequency, the skin 22 is covered by a layer of porous sound absorbing material which, in a preferred embodiment, comprises a layer of fibrous and flexible low density fiber glass 28. This fiber glass layer totally covers the outer surface of the skin, and in turn is suitably covered by an exterior decorative covering 29, normally a thin layer of fabric.

In FIGS. 2 and 3, identical reference numerals have been utilized to identify the structure associated with the opposite sides of the panel 12, except that numerals associated with the back side of the panel (as shown uppermost in FIG. 3) have been additionally designated by addition of a prime (') thereto.

In the panel 12 (FIGS. 2 and 3), the honeycomb layer 21 is substantially of a single cell size, such as cell 24, which cells extend across the full width of the panel between the opposite skins 22 and 22'. However, due to the design of the skins and specifically the manner in which they are provided with openings therein, a selected plurality number of cells 24 communicate with the front side of the panel so as to form Helmholtz chambers 23, whereas a further selected plurality of the cells (designated 24') communicate with the rear side of the panel and form additional Helmholtz resonators 23'. While the cells 24 and 24' are identical, as are the resonators 23 and 23', they nevertheless open outwardly toward opposite sides of the panel so that sound absorption can be achieved on both sides thereof.

Considering now the skin 22, same is provided with a plurality of identical circular apertures 26 extending therethrough, which apertures are disposed within a plurality of vertically extending rows 31 (FIG. 2). The adjacent apertures 26 within each row 31 are spaced apart by a distance which corresponds to the spacing between the centers of the vertically adjacent cells 24, so that the individual apertures 26 within each row 31 thus communicate with the individual cells 24 which are disposed within the vertical column directly behind the skin. This thus results in the formation of a vertically extending row of resonators 23 for absorbing selected sound wave frequencies. The adjacent rows 31 are horizontally spaced apart by a distance which results in the adjacent rows 31 communicating with the alternate vertical columns of cells as formed in the underlying honeycomb layer, thereby leaving intermediate vertical columns of cells (namely the cells 24') which do not communicate with apertures formed in the skin 22. In this manner, the alternate vertical columns of cells 24 as formed in the honeycomb layer thus have the individual cells communicating with the surrounding environment through apertures 26 formed in the skin 22, thereby forming a large plurality of resonators 23 which communicate with the environment adjacent the skin 22. As illustrated in FIGS. 2 and 3, the horizontal spacing between the apertures 26 in the adjacent rows 31 is twice as great as the vertical distance between the adjacent openings 26 within each row 31, thereby resulting in the rows 31 communicating with the alternate vertically extending columns of honeycomb cells.

The intermediate vertical columns of cells 24' in turn communicate with the environment adjacent the other side (the back side) of the panel through openings 26' formed in the back skin 22', which openings 26' are also formed in vertically extending rows 31'. The position of the openings 26' within the rows 31' is identical to the rows 31, and the rows 31' are horizontally spaced apart in the same manner as the rows 31 described above. Rows 31' thus communicate with the alternate vertical columns of cells 24', thereby resulting in a plurality of resonators 23' which open outwardly toward the back side of the panel.

As illustrated in FIGS. 2 and 3, the arrangement of the rows of apertures and the manner in which they communicate with the cells formed in the honeycomb layer permits the skins 22 and 22' to be of identical construction. These skins can thus be manufactured utilizing the identical forming technique, and then properly positioned on the panel to result in alternate series of resonators opening outwardly through both sides of the panel merely by rotating one of the skins (such as skin 22') about a vertical axis through a angle of 180°, which then results in the rows 31 and 31' in the two skins being offset with respect to one another as shown in FIG. 2. This is achieved by positioning the aperture row adjacent one vertical edge of the skin a preselected distance from said edge, and by positioning the aperture row adjacent the other vertical edge a distance from said other edge equal to said preselected distance plus one-half the distance between adjacent rows. Said preselected distance may itself be equal to one-half the distance between adjacent rows. This construction is highly desirable since it permits a substantially simplified forming and assembly procedure by permitting utilization of identical skins, and at the same time permitting utilization of a single honeycomb layer which is of a single cell size and which extends across the complete width of the panel, while resulting in substantially equal quantities of resonators which are rather uniformly distributed over the surface area of the panel and open outwardly through both sides thereof.

A further advantageous feature of this structure is that the apertures 26 are, as shown in FIG. 2, disposed within vertically extending rows, and the apertures within the vertical rows 31 themselves form straight horizontally extending rows which extend across the width of the panel, whereby the apertures are thus disposed within a substantially rectangular grid-like arrangement. This greatly simplifies the formation of the skin, and particularly the initial forming of the apertures therein.

In the embodiments of FIGS. 4–9 as described hereinafter, the same reference numerals used in FIGS. 2–3 are utilized to designate corresponding parts, except that these numerals have been increased by 100, 200, and 400 in FIGS. 4–5, 6–7, and 8–9, respectively.

Figure 5:
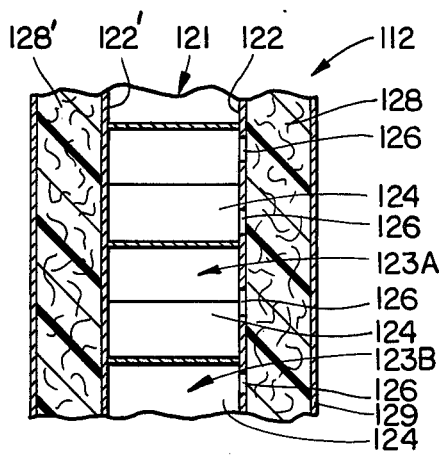
FIG. 5 is a fragmentary sectional view along line V—V in FIG. 4.
Figure 4:
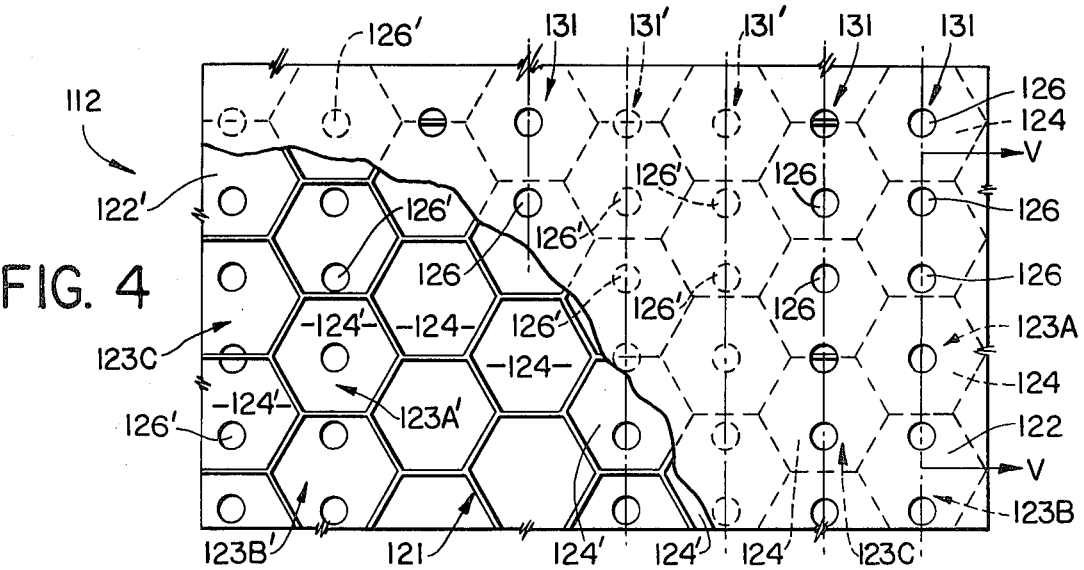
FIG. 4 is a fragmentary elevational view illustrating the core of a modified acoustical panel.

Referring now to FIGS. 4 and 5, there is illustrated a modified panel 112 which is identical to the panel 12 illustrated in FIGS. 2 and 3 except for two variations, both of which relate to the positional arrangement of the holes or apertures within the facing skin. First, as shown in FIG. 4, the holes 126 formed in the skin 122 are disposed within rows 131 which are positioned so that two rows 131 are disposed closely adjacent one another to thereby communicate with the two adjacent vertical columns of cells 124 disposed directly thereunder, with these two rows then being spaced horizontally from the next adjacent two rows 131 by a suitable intermediate space which results in skipping two underlying columns of cells. Thus, when the two identical skins 122 and 122' are rotated 180° so as to be mounted on opposite sides of the panel, this results in the rows of apertures 131 communicating with alternate pairs of vertical columns of cells 124, and results in the rows 131' on the other side communicating with the intermediate pairs of vertical columns of cells 124'.

The second variation in the modified panel 112 of FIGS. 4 and 5 relates to the vertical spacing between the adjacent holes 126. In this embodiment, the adjacent holes 126 are vertically spaced apart by a distance which is less than the centerline-to-centerline spacing between the adjacent cells 124. For example, the individual openings 126 are vertically spaced apart by a distance which is two-thirds (2/3) the vertical spacing between the adjacent cells 124, thereby resulting in three adjacent openings 126 being disposed within the distance occupied by two underlying adjacent cells 124. With this arrangement, the one aperture row 131 results in the formation of two different resonators 123A and 123B which are alternated in the vertical direction of the row. For example, the cell 123A is formed by the communication of a single aperture 126 with the underlying cell 124, with these resonators 123A being located alternately within the vertical column of cells 124. The resonators 123B in turn are formed by two of said apertures 126 communicating with a single underlying cell 124, and these resonators 123B are located alternately between the resonators 123A.

The next adjacent row 131 of apertures also communicates directly with the underlying column of cells 124 and, due to the distance between the adjacent apertures 126, each underlying cell 124 has a single complete aperture 126 communicating therewith. However, a further said aperture 126 is also disposed at the interface between each adjacent pair of cells, and thus a part of the area of this aperture effectively communicates with each cell. This thus effectively results in approximately one and one-half of the apertures communicating with each underlying cell 124, thereby resulting in the formation of resonators 123C which thus have a sound absorption characteristic which is different from that of the resonators 123A and 123B.

In the acoustical panel 112, there is thus formed a plurality of three different types of resonators 123A, 123B and 123C, all of which are effective for absorbing sound waves of different frequency. Further, the pluralities of three different resonators are rather uniformly distributed over the face of each panel, and pluralities of these three different resonators open outwardly on both sides of the panel while at the same time permitting the use of a single layer of uniform cell-size honeycomb, and while additionally permitting the use of identical sheet metal skins having apertures of only a single diameter formed therein.

Figure 6:
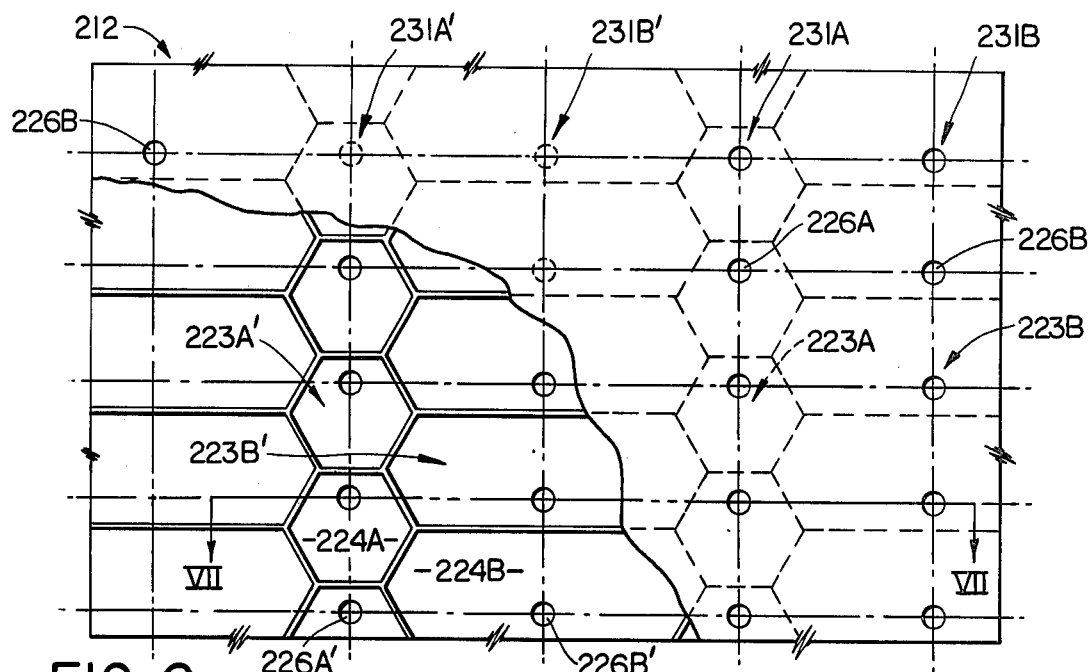
FIG. 6 is a view similar to FIG. 4 and illustrating another embodiment.
Figure 7:
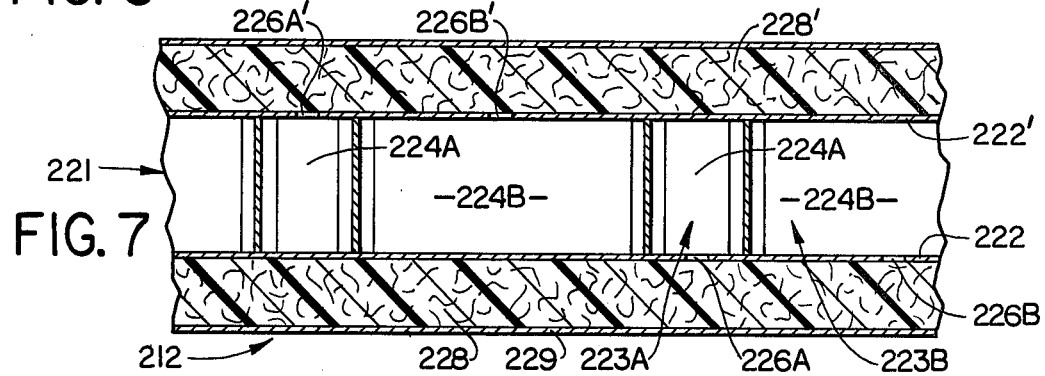
FIG. 7 is a fragmentary sectional view along line VII—VII in FIG. 6.

FIGS. 6 and 7 illustrate another embodiment wherein the acoustical wall panel 212 again utilizes a single honey-comb layer 221 which has the cells thereof extending the full width between the side skins 222 and 222'. In this embodiment, however, the honeycomb layer 221 is of a multiple cell size and particularly includes different sized cells 224A and 224B, with the smaller cells 224A being disposed in vertical columns which are alternately spaced apart by the intermediate vertical columns of the larger cells 224B. The cells 224B preferably have a volume which is several times (i.e., five to ten times) larger than that of the cells 224A.

The skin 222 is provided with alternate rows of apertures 231A and 231B which are defined by identical apertures 226. The adjacent rows 231A and 231B are horizontally spaced apart by a distance substantially equal to the centerline-to-centerline spacing between the adjacent columns of cells 224A and 224B. This thus results in each individual aperture in row 231A communicating with a single underlying cell 224A, and results in each individual aperture in row 231B communicating with a single underlying cell 224B.

The adjacent rows 231A and 231B are disposed in pairs which are alternately spaced across the skin 222, so that the next pair of rows 231A and 231B are suitably spaced by an intervening distance equal to twice the distance between the adjacent columns of cells, in substantially the same manner as with the skins 122 and 122' illustrated in FIG. 4. This alternate spacing between each cooperating pair of rows 231A and 231B thus permits the use of identical skins. The skin 222' is thus identical to the skin 222 but is rotated 180° about a vertical axis, whereby the rows in the skin 222' thus communicate with the intermediate vertical columns of cells 224A' and 224B'. This thus results in two sizes of resonators 223A and 223B opening outwardly through one side of the panel, and similar pluralities of different resonators 223A' and 223B' opening outwardly through the other side of the panel.

Figure 8:
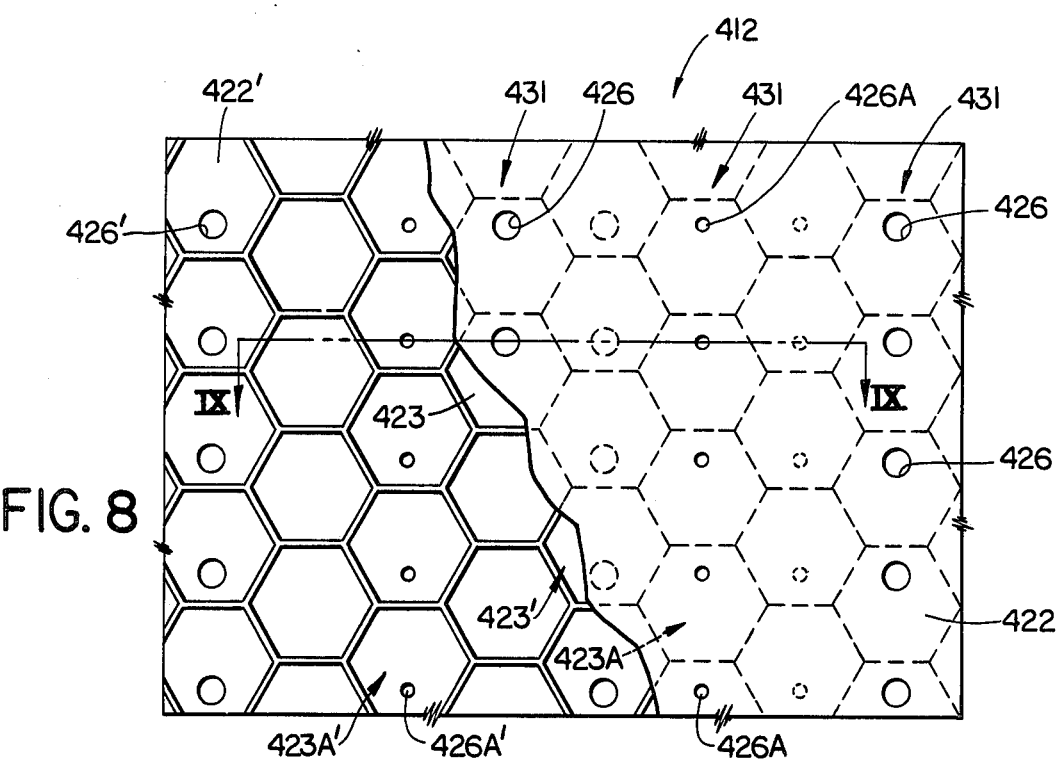
FIG. 8 is a view similar to FIG. 2 and illustrating a further variation.
Figure 9:
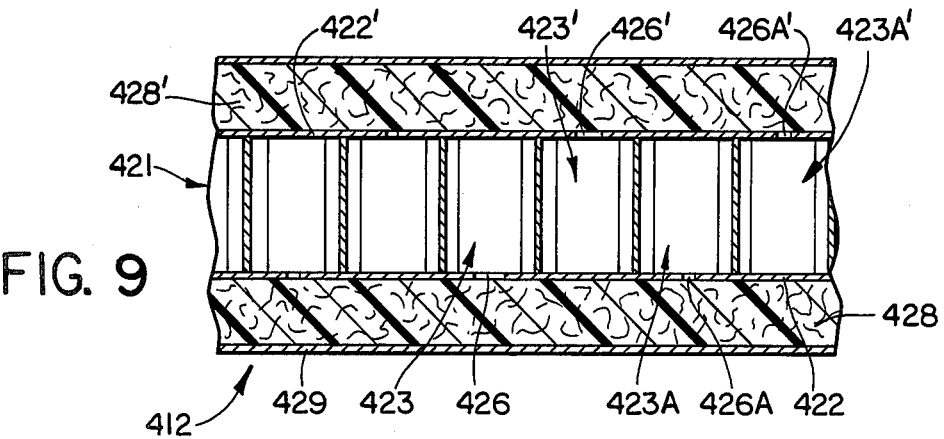
FIG. 9 is a sectional view along line IX—IX in FIG. 8.

Referring now to FIGS. 8 and 9, there is illustrated a preferred embodiment of the invention which is identical to the panel 12 illustrated in FIGS. 2 and 3 except that the apertures as formed in each skin are of two different diameters so as to result in formation of two different Helmholtz resonators capable of absorbing sound waves of different frequency. More specifically, the modified panel 412 has alternate rows 431 of apertures or holes 426 formed in skin 422, which skin has additional rows 431A of apertures 426A disposed alternately between the rows 431. The apertures 426A are of a substantially smaller diameter than the apertures 426. The skin 422 and its cooperation with the honeycomb cells thus results in pluralities of different Helmholtz resonators 423 and 423A opening sidewardly through the skin 422. Substantially identical resonators of different sound absorbing frequency also open outwardly toward the other side of the panel through the opposite skin 422', which skin is identical to skin 422.

While the embodiment of FIGS. 8–9, together with any of the other embodiments described above, discloses only a single hole or aperture communicating with an underlying cell, it will be appreciated that this single aperture can be replaced by two or more apertures of smaller diameter disposed for communication with the underlying cell, provided that the two or more smaller diameter apertures have a total cross-sectional area substantially equal to that of the single larger aperture.

In the numerous embodiments which have been described above, reference has been made to the rows of openings (such as the row 31) extending vertically of the panel. It will be appreciated that the rows of openings, as well as the columns of cells in the honeycomb layer, can also extend horizontally of the panel if desired inasmuch as the honeycomb and/or skin can obviously be oriented with these rows and columns extending either horizontally or vertically. In addition, since the openings are preferably disposed in a rectangular grid arrangement, the individual openings in the vertical rows also are aligned horizontally across the panel so that the rows of holes, whether considered to extend vertically or horizontally, thus function in the same manner.

In operation, the sound waves in the surrounding environment, as experienced in a normal office or commercial building, are predominantly in the range of between approximately 250 to 2,000 cycles per second. A panel according to the present invention is able to absorb a high percentage of these undesired sound waves. The Helmholtz resonators formed within the honeycomb layer are particularly effective for absorbing the sound waves of lower frequencies, specifically those in the 250 to 500 cycles per second range, and possibly up to 1,000 cycles per second. On the other hand, the higher frequency sound waves, such as the frequencies in the range of 1,000 to 2,000 cycles per second, are effectively absorbed by the outer porous sound absorbing layers which overlie the outer skins. The panel 12 is thus able to absorb a substantially high percentage of the sound waves, and at the same time the panel still possesses structural strength and durability resulting from the strength imparted to the panel by both the honeycomb core and the sheet metal skins which are bonded to both the core and the frame.

Since the panel of the present invention can be provided with two or more different Helmholtz resonators associated with each side thereof, this enables the panel to absorb a wider range of sound frequencies. The ability to provide pluralities of different Helmholtz resonators is greatly facilitated by the use of identical skins on opposite sides of the panel, which skins themselves can be provided with a plurality of identical openings formed therethrough in a rectangular grid-like arrangement, so that different numbers of openings thus communicate with different cells to form resonators having different sound absorbing characteristics. This structure, at the same time, enables the use of a single honeycomb layer which extends across the width between the facing skins, thereby substantially simplifying and minimizing the constructional complexities and expense associated with the panel. This also enables use of a conventional honeycomb layer employing a single cell size, which is thus a standard commercially available structure, although the present invention is also applicable for use with a specialized honeycomb layer employing plural cell sizes.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In an upright space divider panel having a rigid rectangular frame defined by top and bottom rail members which are joined together by side rail members, first and second thin sheetlike skins fixed to the opposite sides of the frame and extending across the region defined within the frame, and a honeycomb core structure disposed within the frame and confined between said first and second skins, said core structure and said skins cooperating to define a plurality of sound-absorbing Helmholtz resonators, the improvement wherein said honeycomb core structure comprises a single cellular honeycomb layer having a plurality of cells formed therein which individually extend across the width of the layer and have the opposite ends thereof closed by said first and second skins, said first and second skins being identical and each having a plurality of openings formed therethrough, the plurality of openings formed through said first skin communicating with one end of a first plurality of said cells for forming a first plurality of said sound-absorbing resonators which open outwardly through one side of the panel, the other end of said first plurality of cells being closed by imperforate portions of said second skin, the plurality of openings formed through said second skin communicating with one end of a second plurality of said cells for forming a second plurality of said sound-absorbing resonators which open outwardly through the other side of said panel, the cells of said second plurality being separate from the cells of said first plurality, and the other end of said second plurality of cells being closed by imperforate portions of said first skin.

2. A wall panel according to claim 1, wherein all of the cells in said honeycomb layer are of uniform size.

3. A panel according to claim 2, wherein the openings in each skin are disposed in a plurality of spaced rows, and wherein the first and second identical skins are relatively rotated 180° with respect to one another when positioned on opposite sides of the panel so that the rows of openings formed in the first skin are alternately positioned between the rows of openings formed in the second skin.

4. A panel according to claim 3, wherein said plurality of openings as associated with each skin includes pluralities of first and second openings which are of different cross-sectional areas, said first openings communicating with selected ones of said cells for forming first sound-absorbing resonators capable of absorbing sound waves of a first selected frequency, and said second openings communicating with different ones of said cells for forming second sound-absorbing resonators capable of absorbing sound waves of a second selected frequency which is substantially different from said first selected frequency.

5. A panel according to claim 4, wherein said first openings are disposed within a plurality of substantially parallel spaced-apart rows, and wherein said second openings are also disposed within a plurality of substantially parallel spaced-apart rows, said rows of second openings being alternately disposed between said rows of first openings.

6. A panel according to claim 3, wherein said plurality of openings as associated with each skin includes a plurality of first openings communicating with selected ones of said cells and a plurality of second openings communicating with different ones of said cells, the total area of said first openings as communicating with each of said selected cells being substantially greater than the total area of said second openings as communicating with each of said different cells so as to define sound-absorbing resonators capable of absorbing sound waves of substantially different frequency.

7. A panel according to claim 3, wherein at least some of the rows have the openings therein spaced apart by a distance which is less than the spacing between the adjacent cells so that different numbers of openings communicate with different cells to result in formation of at least two different sound absorbing chambers having different sound absorbing characteristics.

8. A wall panel according to claim 7, wherein all of the openings as formed in each skin are of the same cross-sectional area.

9. A panel according to claim 1, wherein the cells of the honeycomb layer are all of uniform size, and wherein the plurality of openings as formed in each skin are positioned such that different opening areas communicate with the different cells to form at least two pluralities of different sound absorbing resonators which have different sound absorbing characteristics.

10. A wall panel according to claim 1, wherein each of said identical skins has said plurality of openings formed therein and disposed within a pattern which is non-symmetrical with respect to the skin, and wherein said first and second skins are relatively rotated 180° with respect to one another when positioned on opposite sides of the panel.

11. A panel according to claim 10, including a layer of porous sound absorbing material positioned exteriorly of and overlying each of the sheetlike skins for absorbing sound waves of higher frequency.

12. A panel according to claim 4, including a layer of porous sound absorbing material positioned exteriorly of and overlying each of the sheetlike skins for absorbing sound waves of higher frequency.

13. In an interior space dividing wall formed from a plurality of portable interior upright space divider panels which are horizontally connected together in series, at least one of said panels being of an acoustical construction for absorbing sound waves, said acoustical panel having enlarged oppositely facing side surfaces and a sound absorbing core structure defined between said side surfaces and extending substantially coextensively over the area thereof, said core structure including first means for absorbing sound waves of a first frequency and second means for absorbing sound waves of a second frequency which is substantially different from said first frequency, one of said first and second sound absorbing means including a plurality of Helmholtz resonators each defined by a small substantially closed chamber disposed interiorly of the panel and communicating with the surrounding environment through small opening means which open outwardly from the respective chamber toward one of the side surfaces of the panel, approximately one-half of said plurality of said resonators opening outwardly toward one side of said panel and the remaining approximately one-half of said plurality of resonators opening outwardly toward the other side of said panel, the improvement wherein said sound absorbing core structure comprises a single cellular honeycomb layer having a plurality of cells formed therein which individually extend across the width of said layer, all of the cells in said honeycomb layer being of a uniform size, first and second thin sheetlike skins respectively extending across said one side and said other side of said panel for confining said honeycomb layer therebetween whereby the opposite ends of said cells are substantially closed by said first and second skins, said first and second skins being identical and each having a plurality of small openings formed therethrough for communication with selected cells to define said plurality of resonators, the plurality of openings formed through said first skin communicating with one end of selected said cells for forming those resonators which open outwardly through said one side of the panel, the other end of said selected cells being closed by imperforate portions of said second skin, the plurality of openings formed through said second skin communicating with one end of others of said cells for forming those resonators which open outwardly through said other side of the panel, the other end of said other cells being closed by imperforate portions of said first skin.

14. A wall system according to claim 13, wherein the other of said first and second sound absorbing means includes a second plurality of openings formed through each of said first and second skins and communicating with additional said cells for defining a second plurality of Helmholtz resonators for absorbing sound waves of said second frequency, approximately one-half of said second plurality of Helmholtz resonators opening outwardly through said one side of the panel whereas the remainder of said latter-mentioned resonators open outwardly through said other side of the panel, said additional cells of said second Helmholtz resonators being separate from the cells associated with said first-mentioned Helmholtz resonators, each of said additional cells as associated with said second resonators being totally closed at one end by one of said skins, the total area of said second openings as communicating with each of said second Helmholtz resonators being substantially different from the total area of said first-mentioned openings as communicating with each of said first-mentioned resonators.

15. A wall system according to claim 14, wherein the individual openings of said first-mentioned and second pluralities of openings are distributed approximately uniformly over substantially the complete area of each of said first and second skins.

16. A wall system according to claim 14, wherein said core structure includes third means for absorbing sound waves of a third frequency which is different from said first and second frequencies, said third sound absorbing means including a layer of porous sound absorbing material positioned exteriorly of and overlying each of said sheetlike skins.

17. A wall system according to claim 13, wherein the other of said first and second sound absorbing means includes a layer of porous sound absorbing material positioned exteriorly of and overlying each of the sheetlike skins.

18. A wall system according to claim 13, wherein each of said identical skins has said plurality of openings formed therein and disposed within a pattern which is non-symmetrical with respect to the skin, and wherein said first and second skins are relatively rotated 180° with respect to one another when positioned on opposite sides of the panel.

* * * * *